Patented Sept. 18, 1951

2,568,364

UNITED STATES PATENT OFFICE 2,568,364

PROCESS OF MAKING INVESTMENT MOLD

William Henry Duesbury and Clifford Atkins, Derby, England, assignors to Rolls-Royce Limited, Derby, England, a British company No Drawing. Application December 2, 1948, Serial No. 63,198. In Great Britain December 11, 1947

3 Claims. (Cl. 22—193)

1

This invention is for improvements in precision casting. It is chiefly applicable to the casting of articles from metals having high melting points (i. e. of the order of 1400° C.) such as are used for compressor and turbine blades of internal combustion turbines but it may also be used for the precision casting of metals of lower melting points.

A process of precision casting of engineering parts from metals of high melting point is known which includes the following steps. A pattern is produced from wax or plastic material or low melting point alloys, the pattern (or a number of patterns assembled together) are given a refractory coat by being sprayed or pained with, or dipped in, a finely crushed refractory suspended in a liquid binder. A flask is then placed around the coated pattern or group of patterns and a coarser refractory suspended in a liquid binder is poured in while the flask is vibrated. (This material is called "the investment".) The surplus liquid is usually then poured off, the investment is allowed to set, subsequently the pattern is melted or burnt out and the mould is fired and ready for casting.

In the process of casting articles from metals of high melting point, one known coating medium has a composition of soap solution, sodium silicate, hydrochloric acid and flint powder. This coating is very suitable for use with a known investment comprising as its principal ingredients fired fireclay (grog), silica flour, calcined magnesia, industrial methylated spirits (industrial ethyl alcohol containing some methylalcohol) and ethyl silicate. This investment has a number of disadvantages. Ethyl silicate and industrial methylated spirits are costly, the investment is very sensitive to changes in temperature and to the presence of damp in the powders used, the alcohol is highly inflammable necessitating the use of flame proof equipment and the payment of a high insurance premium on the building used. Ethyl silicate is likely to cause dermatitis and will contaminate any food-stuff into which it may come in contact and the use of silica flour necessitates elaborate precautions to prevent the work-people getting silicosis.

According to this invention we use in the process of precision casting a pattern coated with a coating formed of a high refractory material which is bound by ethyl silicate with the addition of a condensing agent in combination with an investment which is bound by cement and which is waterborne.

By use of this invention the disadvantages of the form of investment previously described are avoided. The use of methylated spirits is avoided entirely in the investment, and as ethyl silicate is used in the coating only and not in the investment, the quantity employed can be reduced by an amount in the order of 90 percent. The casting process is accordingly cheapened and made much more safe for the work-people.

Suitable condensing agents for use in the coating are monoethanolamine and piperidine. A suitable high refractory material is potter's flint.

The binder provided by the ethyl silicate with the addition of a condensing agent forms a silicic acid gel, which will bind the refractory material and will not be dissolved in or be attacked by water.

The cement used for binding the investment may be that commonly known as "Portland cement" and includes high alumina cement such as "Ciment Fondu" or "Lightning cement." The investment material, bound by the cement and water-borne, includes a refractory material such as grog (fire-clay, inert and refractory).

The investment material preferably consists of suitably graded refractory, such as grog, with or without the addition of fine material mentioned below, and cement within the following limits:

| | Per cent by weight |
|---|---|
| Refractory | 75 to 96 |
| Cement | 4 to 25 |

Fine refractory material such as the mixture of alumina and silica (ground fire brick known in the art as charp) or silica flour, or the fired or calcined fireclay known in the art as molochite and other like refractories may be added to vary the thermal expansion/contraction coefficient; also, the addition of fine refractory material may produce a harder mould for a slight reduction in cement.

The coating may be applied to the pattern by spraying or painting the mixture on to the pattern or by dipping the pattern in the mixture.

In certain cases it may be desirable to apply the refractory mixed with the ethyl silicate separately from the condensing agent, to avoid gelling prior to application, particularly when the coating is applied by spraying when such gelling may result in malfunctioning of the spraying equipment, with a resultant lack of uniformity of the coating. Thus the refractory material and ethyl silicate can be sprayed through one nozzle and the condensing agent through another nozzle (which may be combined in the same hand tool with two supply lines thereto). In this manner the two will be mixed together in their passage from the nozzles on to the pattern.

Where, however, the ethyl silicate and condensing agent are previously mixed as a stock solution, this solution has been found to be stable provided it is kept in an enclosed vessel. For example a mixture of ethyl silicate and monoethanolamine is purchasable on the commercial market. Likewise, a mixture of ethyl silicate and piperidine is also purchasable on the commercial market.

After firing, the ethyl silicate forms pure silica, which bonds the spray coat and assists in its refractoriness.

The monoethanolamine or piperidine acts as a condensing agent controlling the rate of hydrolysis and thus the rate of setting of the ethyl silicate. With such condensing agents, hydrolysis of the ethyl silicate takes place without the addition of a high percentage of alcohol, in combination with hydrochloric acid hitherto used as a hydrolising agent.

Suitable materials for the high refractory are ground potter's flint, fused or calcined alumina, or sillimanite.

The refractory coat forming material may optionally contain a wetting agent with or without a volatile solvent miscible with ethyl silicate, such as alcohol.

The wetting agent is used to ensure continuity of the film on the expendible pattern and to facilitate mixing of the ingredients. Numerous known wetting agents may be employed, providing they are miscible with ethyl silicate, with or without a common solvent. They should preferably not be of the metallic soap type since their dissociation at high temperatures produces metallic oxides of low refractoriness.

The chief function of the alcohol is to increase the volatility of the spray, giving improved spraying properties. It is useful to add the wetting agent as a solution in the alcohol.

The refractory material in conjunction with the binder, forms a hard coating on the pattern when hydrolysis is completed by standing and subsequent heating, the coating possessing the ability to withstand the temperature and action of the metal being cast.

In addition, the coat forming material may contain some china clay or other clays, for the purpose of determining of the coefficient of thermal expansion of the coating appropriate to that of the investment material. Ball clay has been found suitable for this purpose.

Preferred coating materials containing monoethanolamine may be constituted within the following ranges:

Liquids (percentage volume of total liquid):
                Percent
 Ethyl silicate plus monoethanolamine
  (1–5% by volume of ethyl silicate)_ 50–100
 Wetting agent _____ 0– 12
 Solvent _____ 0– 38
Solids (percentage weight of total solid):
 High refractory _____ 70–100
 China or equivalent clay _____ 0– 30 the ratio of solid to liquid being chosen to suit requirements.

A typical coating material within the above ranges, which has given satisfactory results, is as follows:

C

Liquids:
 Ethyl silicate _____ccs__ 230
 Monoethanolamine _____ ccs__ 4.7
 Wetting agent _____ ccs__ 2.5
 Alcohol (Industrial alcohol) _____ccs__ 12.5
Solids:
 Potter's flint_____oz__ 16
 China clay _____oz__ 3

In the above the ethyl silicate and monoethanolamine may be replaced by a prepared mixture purchasable as Silester E.

Preferred coating materials containing piperidine may be constituted within the following ranges:

Liquids (percentage volume of total liquid):
                Percent
 Ethyl silicate plus piperidine (1–5%
  by volume of ethyl silicate)_____ 38–100
 Solvent _____ 0– 50
 Wetting agent _____ 0– 12
Solids (percentage weight of total solids):
 High refractory _____ 70–100
 China clay _____ 0– 30 the ratio of solids to liquids being chosen to suit requirements.

A typical coating material, within the above ranges, which has been found satisfactory in use is:

D

Liquids:
 Ethyl silicate _____ccs__ 225
 Piperidine _____ccs__ 4.5
 Wetting agent _____ccs__ 5
 Alcohol (industrial alcohol) _____ccs__ 25
Solids:
 Potter's flint _____oz__ 16
 China clay _____oz__ 3

In the above, the ethyl silicate and piperidine mixture may be replaced by a prepared purchasable mixture such as Silester 2.

The ratio of liquids to solids may be chosen to suit individual requirements. For example, different spray guns require spraying materials of differing viscosities. Further the quantity of solvent may be considerably higher with coatings containing piperidine than those containing monoethanolamine, due to the more pronounced tendency of the latter to gel.

The composition of typical cement bound highly porous investments is as follows:

A

Percent by weight
Suitably graded grog _____ 90.5
Cement (Portland) _____ 9.5
Water according to requirements.

B

Percent by weight
Suitably graded grog _____ 93.0
Alumina cement _____ 7.0
Water according to requirements.

The grog may be replaced by other refractory materials such as molochite or sillimanite of the correct grading; grog, however, is preferred, being relatively cheap. A typical sieve analysis of grog used in an investment according to the invention is as follows:

| B. S. Sieve No. | Percentage by weight retained by sieve |
| --- | --- |
| +8 | 0.0 |
| +10 | 0.0 |
| +16 | 0.0 |
| +36 | 21.9 |
| +52 | 17.1 |
| +72 | 14.0 |
| +100 | 8.2 |
| +150 | 13.0 |
| +200 | 5.6 |
| −200 | [1] 20.2 |

[1] Passing 200 sieve.

A fine refractory material may be used in certain cases (up to say 25% of the total refractory)

to improve the sieve characteristics of a grog which is otherwise considered excessively coarse. For example, a typical sieve analysis of charp or chammotte suitable for addition for the purpose of producing a finer refractory is as follows:

| B. S. Sieve No. | Percentage by weight retained by sieve |
|---|---|
| +52 | 0.2 |
| +72 | 0.9 |
| +100 | 2.3 |
| +150 | 7.7 |
| +200 | 13.7 |
| −200 | [1] 75.2 |

[1] Passing 200 sieve.

The quantity of cement used may be varied considerably to suit individual requirements, but if too much is used, the fired moulds are so hard that it is difficult to knock out the casting.

The optimum strength is such that the moulds are strong enough to handle both green and fired but after casting will split open on their own account due to the contraction of the metal in the casting. By splitting the mould there is less risk of hot tears in the casting or of undue distortion. It also greatly facilitates the removal of the casting from the mould.

The quantities of grog and chammotte etc. may be also varied to suit individual conditions, but if an excessive amount of fine material is introduced, great difficulty will be experienced in making the investment settle during the jolting operation.

About 140 ccs. of water should be used per pound of solid investment mix. This quantity will be varied again to suit individual requirements as some fillers are more porous than others and consequently will require more water.

After the investment has settled on the jolters or vibrators the top liquid may be poured off, after which the moulds should be allowed to stand to set. In the case of Portland Cement a setting time of 24 hours is recommended. With high alumina cements the period may be less. After setting the mould may be removed from the metal or equivalent flask and the wax melted or burnt out of the mould.

Precision casting with refractory coatings and water-borne investments according to this invention is particularly suitable for casting metals of high melting points such as are used for fixed nozzle guide vanes of internal combustion turbines and similar applications, but it may also be used for articles of less high melting point, in which case lower refractories than potter's flint or calcined alumina can be used in the coating.

What we claim is:

1. A process for the preparation of a mold for precision casting comprising applying to the surface of an expandable pattern a liquid coating including a high refractory ethyl silicate binder and a condensing agent for the ethyl silicate selected from the group consisting of monoethanolamine and piperidine to form a coating impervious to the action of water and hydraulic cement and thereafter investing the coated pattern with an aqueous slurry comprising 75 to 96% by weight of refractory material and from 4 to 25% by weight of a hydraulic cement.

2. The process of claim 1 in which the condensing agent for the ethyl silicate is monoethanolamine.

3. The process of claim 1 in which the condensing agent for the ethyl silicate is piperidine.

WILLIAM HENRY DUESBURY.
CLIFFORD ATKINS.

REFERENCES CITED

The following references are of record in the file of this patent:

UNITED STATES PATENTS

| Number | Name | Date |
|---|---|---|
| 67,181 | Farrar | July 30, 1867 |
| 348,105 | Blackwell | Aug. 24, 1886 |
| 575,074 | Smith | Jan. 12, 1897 |
| 1,882,701 | Alley | Oct. 18, 1932 |
| 1,956,278 | Erdle | Apr. 24, 1934 |
| 2,081,558 | Prange | May 25, 1937 |
| 2,169,385 | Hall | Aug. 15, 1939 |
| 2,243,094 | Grossman | May 27, 1941 |
| 2,380,945 | Collins | Aug. 7, 1945 |
| 2,441,695 | Feagin | May 18, 1948 |

FOREIGN PATENTS

| Number | Country | Date |
|---|---|---|
| 575,734 | Great Britain | Jan. 13, 1946 |
| 580,058 | Great Britain | Aug. 26, 1946 |